April 5, 1960         W. M. CLARK         2,931,723

PHOTOGRAPHIC REPRODUCTION OF MULTIPLE WEDGE SCANNER

Filed Sept. 1, 1953         2 Sheets-Sheet 1

INVENTOR:
Walter M. Clark
By Herbert E. Metcalf
His Patent Attorney

April 5, 1960     W. M. CLARK     2,931,723

PHOTOGRAPHIC REPRODUCTION OF MULTIPLE WEDGE SCANNER

Filed Sept. 1, 1953     2 Sheets-Sheet 2

INVENTOR:
Walter M. Clark
By Hubert E. Metcalf
His Patent Attorney

2,931,723

PHOTOGRAPHIC REPRODUCTION OF MULTIPLE WEDGE SCANNER

Walter M. Clark, North Redondo, Calif., assignor to Northrop Corporation, Hawthorne, Calif., a corporation of California Application September 1, 1953, Serial No. 377,814

1 Claim. (Cl. 96—41)

My invention relates to a novel means and method of reproducing images with very high resolution and more particularly to the photographic reproduction of a scanner image having multiple black and clear wedges with apexes terminating at a common point with very high resolution.

Due to the tremendous distances between the stars and a missile, even when in flight, small angular discrepancies in measurement will tend to throw the missile far off its prospective target. Thus the measuring scanners must be so designed as to accurately record on the electronic instruments employed, the position of the missile wtih respect to the star or stars used as reference points. This entails the use of a scanner having very high resolution. It is to be recalled that where two points are placed on a paper, the naked eye will see two distinct points until the distance between the eye and the paper has reached a certain amount, at which position the two points appear to fuse as one and the eye thereafter is able to discern only one point. This is the limit of the resolution of the eye.

Similarly film and lenses have this characteristic ability of resolving points or lines. The number of lines per millimeter which either of the aforementioned are able to detect before the lines appear to fuse as a solid line is the usual way of characterizing the resolution of the film or lens.

The missile is caused to be guided by virtue of its position with respect to a given star. The telescope is positioned so that the axis of same and the scanner are in alignment. The scanner is a rotating photographic plate disk having alternate opaque and clear wedge sections terminating at the center of the disk. When the star is out of alignment with the axes, pulses will be sent from a photo cell, in connection with the scanner, thus causing the course of the missile to be altered. The closer to the axis that the star is able to be scanned by the clear wedge sections of the scanner, the more accurate will be the course of the missile. Hence, if the scanner has a very high resolution, the star may be scanned very close to the scanner axis; otherwise, the lines of the scanner will fuse solid and preclude the star from being scanned with the desired accuracy through the clear wedge sections.

It is therefore a general object of my invention to provide a novel means and method of obtaining a very high resolution in the immediate vicinity of an apex of lines.

A more specific object is to provide a novel means and method of reproducing a multiple wedge scanner image that has multiple black and clear wedges with apexes terminating at a common point with very high resolution.

Other objects and uses will manifest themselves from the subsequent disclosure and drawings forming part of the specification wherein.

Figure 1:
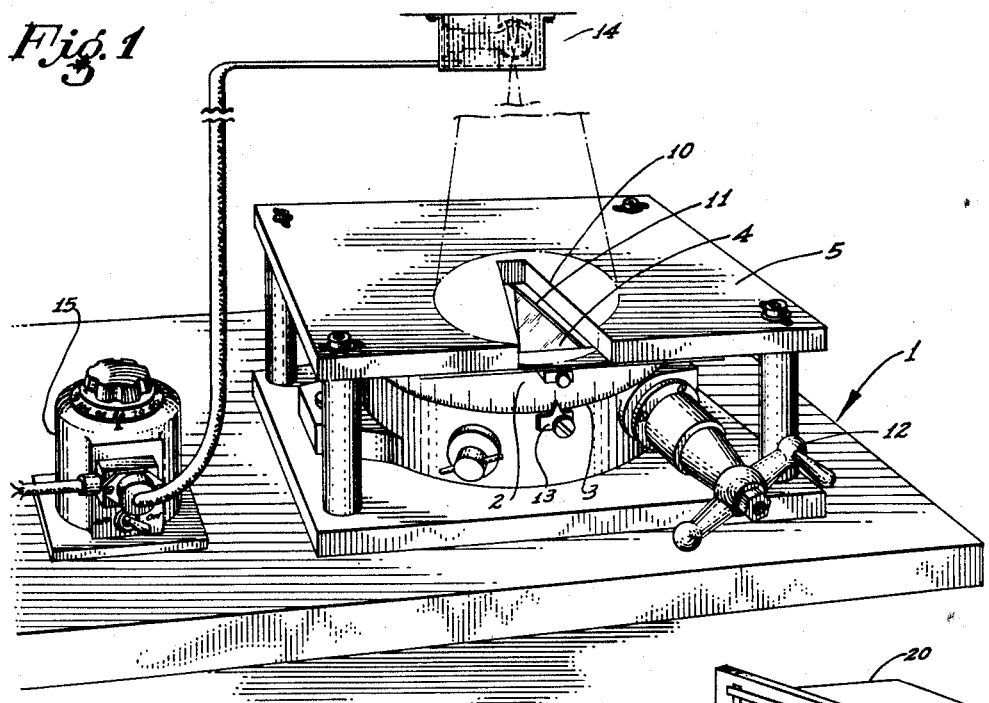
Figure 1 is a perspective view showing the apparatus used in photographing the initial scanner master.
Figure 2:
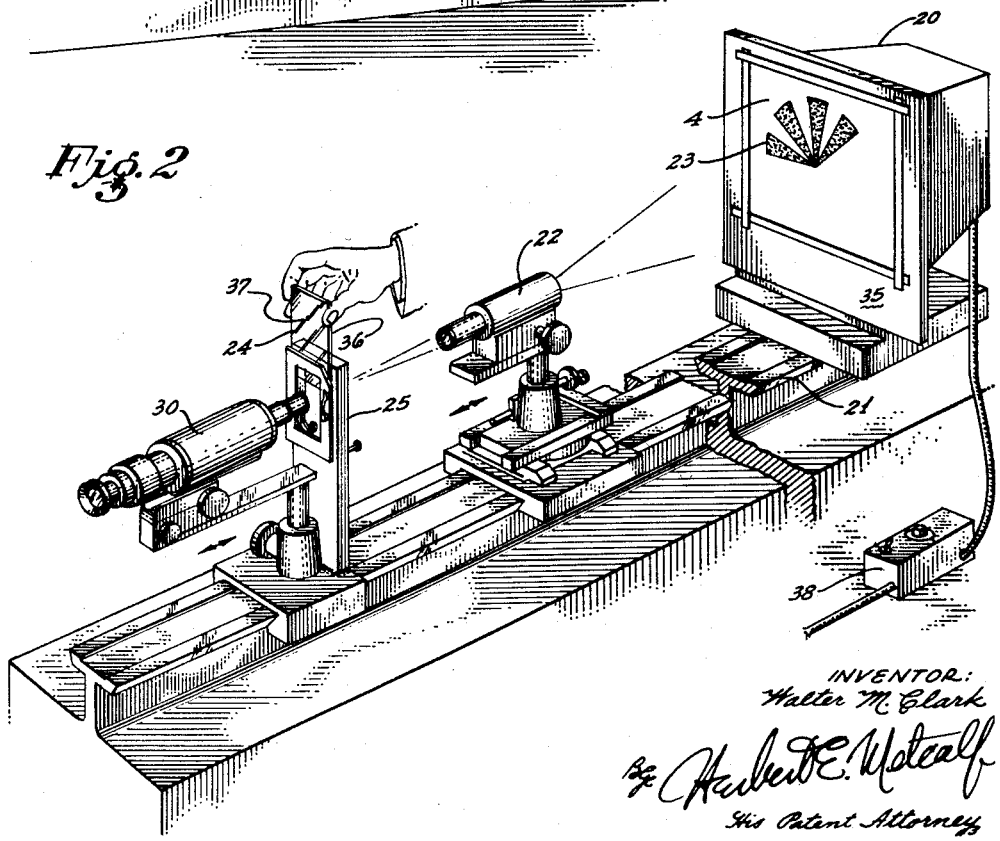
Figure 2 is a perspective view of the optical system used in accurately reducing the size of the initial scanner image.

For a detailed description of my invention, reference is had to the drawings. A table 1 having a rotary platform 2 with an angular index 3 disposed around the circumference thereof, provides a support for a photosensitive plate 4 to be releasably secured thereto. An adjustable stationary platform 5 has a slot 10 cut therein and thin masking shims 11 glued thereto such that the shims 11 form an angle of the desired magnitude. A handcrank 12 is used to turn the rotary platform 2 to any given position with respect to the indicator 13. The intensity of the point light 14 used to make the exposures on the photosensitive plate 4 is controlled by a "Variac" 15. The exposed plate 4 is placed in a light box 20 having a ground glass surface to obtain uniform back lighting, the box 20 being placed on optical rails 21. A lens 22 is used to transfer the image 23 of the plate 4 to an intermediate photosensitive plate 24 which is placed within the plate-holder 25. Behind the plate-holder 25 is a microscope 30 movable on the rails 21 with said holder 25 and having its optical axis in alignment with that of the lens 22, also on the rails 21, the image 23 on the plate 4, and the intermediate plate 30.

Figure 3:
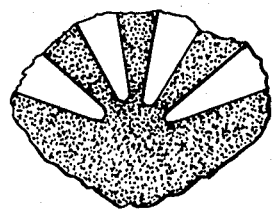
Figure 3 is a fragmentary view of a conventional disk without high resolution at the center of the apexes of several wedges showing the crawling effect of the wedges at the center.
Figure 4:
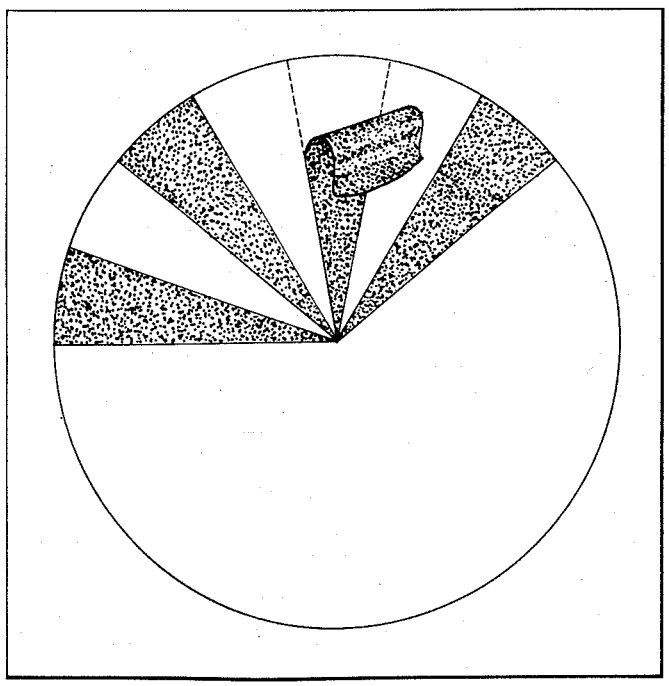
Figure 4 is a plan view of the intermediate photo-sensitive plate after development. The reduced scanner image is shown in its enlarged state by virtue of masking the respective scanner wedges.

The actual procedure involved in producing a scanner disk 31 having very high resolution at the center 32 of the disk 31 where all the tips 34 of the scanner wedges 33 meet at a point, follows. To accomplish the result and thus prevent crawling of the lines in the vicinity of the disk center 32, as best shown in Figure 3, a reduction process is utilized. The masking shims 11, positioned with a precision machined angle wedge, are secured to the underneath surface of the stationary platform 5, as by gluing or some other convenient means, to form an accurate angle of the desired magnitude. It is desired that all the wedge tips 34 which will appear on the photosensitive plate 4 converge at one point. The stationary platform 5 is then adjusted, by use of highly precisioned optical instruments (not shown), until the vertex of the angle and the center of the rotary platform 2 are placed in vertical alignment. In a photo dark room the photosensitive plate 4 is slid onto the rotary platform 2 and an exposure taken by turning on a voltage controlled overhead light 14. Since alternate clear and opaque wedges 33b and 33a are desired for the scanner disk 31, the rotary platform 2 is rotated to an angular position, with respect to the original reference mark, which is equal to twice the magnitude of the angle made by the shims 11 and the next exposure taken, and so on, until all the required exposures are made. The plate 4 is then processed, i.e. developed and permanently fixed. If the overhead light 14 is not properly positioned it is probable that the tips 34 of the wedges 33 will not meet at a common center, i.e. within the allowable tolerance limits. Should this be the case the light 14 will have to be repositioned so that the angle of the beam will align all the wedge tips within the required limits. The processed plate 4 is then taped to an opal glass 35, which may form one side of the light box 20, and the lens 22 will transfer the image 23 of the scanner disk 31 onto a plane behind the lens 22. A clear photo-sensitive processed plate 24 is seated within the plate- holder 25 with the emulsion side 36 toward the image 23 on the opal glass 35 and the optical system is then axially aligned. A splotch of ink 37 is placed on the emulsion side 36 of the plate and the viewing microscope 30 adjusted until it is accurately focused on the image of the ink 37, which represents the emulsion plane. The lens 22 is then moved on the optical rails 21 until the scanner image 23 on plate 24 is accurately focused with respect to the microscope 30. Thus the viewing microscope 30 shows two critically sharp images at once, the emulsion of the clear plate 24 and the image of the pattern. A graduated scale within the microscope 30 shows the magnitude of the reduction of the image 23. The optical system with the exception of the light box 20, which is far removed from the other components, depending upon degree of reduction desired, is caused to be placed in darkness either by placing a hood over it or by darkening the room. A photosensitive plate is substituted for the clear processed plate 24 and seated within the plate-holder 25. The light within the light box 20 is turned on by a switch on a timer 38 and an exposure made so that the intermediate plate in holder 25 when developed and fixed will have a reduced scanner image centrally located on a clear transparent plate. Since it is desired to increase the size of the segments 33 of the reduced scanner image, a contact print of the reduced image is made on a photosensitive plate of much larger area than the plate placed in holder 25. However, if the plate holder 25 is sufficiently large enough, the reduced image on the intermediate plate may be directly enlarged without the necessity of making a separate contact plate. The image is then still further manually enlarged by inking so as to extend the wedge segments 33 of the reduced image and their wedges masked to extend the opaque and clear sections 33a and 33b as shown in Figure 4 from their reduced size to that of an image greatly increased.

Figure 6:
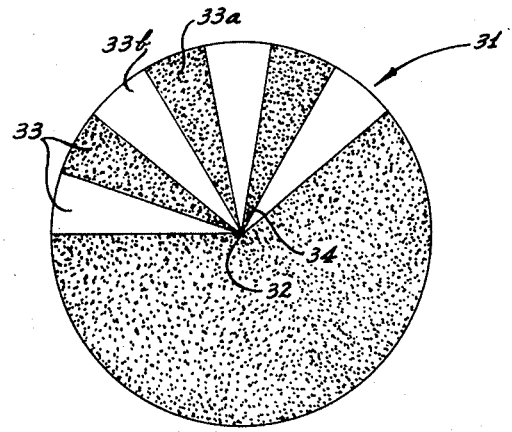
Figure 6 is a plan view of the scanner disk after processing and cutting showing the high degree of resolution at the center.
Figure 5:
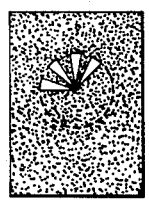
Figure 5 is a plan view of the final photosensitive plate prior to cutting.

The aforementioned procedure is repeated so that another photosensitive plate placed in the holder 25 will give a reduced image as shown in Figure 5 of the enlarged masked intermediate plate which is subsequently cut along the dotted lines to give the desired scanner of Figure 6. Thus, whereas initially the exposed contact plate gave a certain amount of crawl at the apex, as shown in Figure 3, due to the fact that the shim stock 11 could not feasibly be assembled to form as accurate an angular vertex in the wedge sections as the tolerances required, by virtue of the reduction process it has been possible to achieve an image resolution in the order of .0002 inch.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

The method of producing a scanner image pattern or the like having a high degree of resolution which comprises the following steps: providing a first plate a side surface of which is processed to provide a photosensitive surface; providing a second plate and forming a sector shaped opening therein; masking off all of said photosensitive surface, with the exception of the area exposed by said sector shaped opening, by juxtapositioning said second plate on said first plate with a side surface thereof in contact with said photosensitive surface; imparting angular movement of one plate with respect to the other plate through a plurality of predetermined arcs to sequentially expose a plurality of sector shaped areas on said photosensitive surface which are spaced from each other and which have their apices located at a common point; individually exposing said plurality of sequentially exposed sector shaped areas on said photosensitive surface to a single light source to provide a scanner image; and processing said photosensitive surface to render permanent the scanner image pattern provided thereon.

References Cited in the file of this patent

UNITED STATES PATENTS

| | | |
|---|---|---|
| 357,746 | Vansant | Feb. 15, 1887 |
| 1,366,158 | Brown | Jan. 18, 1921 |
| 1,949,351 | Buholzer | Feb. 27, 1934 |
| 2,357,913 | Sigford | Sept. 12, 1944 |

OTHER REFERENCES

Pages 7–15 of January 1950 issue of "Photographic Engineering."

B.I.O.S. Final Report No. 1552, item No. 9, Methods of Graticule Production at J. D. Moller, Wedel/Holstein; reported by Dr. E. Bovey, M.O.S. Dates of Investigation: From Nov. 25, 1946 to Dec. 13, 1946. British Intelligency Objectives Sub-Committee. London, H.M. Stationery Office.